(12) United States Patent
Konno et al.

(10) Patent No.: US 11,872,686 B2
(45) Date of Patent: Jan. 16, 2024

(54) ROBOT SYSTEM

(71) Applicant: KABUSHIKI KAISHA YASKAWA DENKI, Fukuoka (JP)

(72) Inventors: Tsuyoshi Konno, Fukuoka (JP); Katsuhiko Yoshino, Fukuoka (JP); Manabu Iida, Fukuoka (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 0 days.

(21) Appl. No.: 17/643,099

(22) Filed: Dec. 7, 2021

(65) Prior Publication Data

US 2022/0176566 A1    Jun. 9, 2022

(30) Foreign Application Priority Data

Dec. 9, 2020  (JP) ................................ 2020-204232

(51) Int. Cl.
| | | |
|---|---|---|
| B25J 11/00 | (2006.01) | |
| B25J 15/00 | (2006.01) | |
| B05B 16/20 | (2018.01) | |
| B05B 16/00 | (2018.01) | |
| B25J 9/00 | (2006.01) | |
| B25J 19/00 | (2006.01) | |

(52) U.S. Cl.
CPC .......... *B25J 11/0075* (2013.01); *B05B 16/20* (2018.02); *B05B 16/90* (2018.02); *B25J 15/0019* (2013.01); *B25J 9/0009* (2013.01); *B25J 19/0025* (2013.01); *B25J 19/0075* (2013.01)

(58) Field of Classification Search
None
See application file for complete search history.

(56) References Cited

U.S. PATENT DOCUMENTS

| | | | | |
|---|---|---|---|---|
| 4,532,148 A | * | 7/1985 | Vecellio .............. | B05B 13/0452 118/631 |
| 4,539,932 A | * | 9/1985 | Vecellio ................... | B05B 5/04 118/631 |
| 4,611,695 A | * | 9/1986 | Kato ................... | B05B 13/0442 901/43 |
| 4,768,462 A | * | 9/1988 | Kuronaga ........... | B05B 13/0452 118/314 |
| 4,896,357 A | * | 1/1990 | Hatano .................. | B25J 13/003 901/3 |

(Continued)

FOREIGN PATENT DOCUMENTS

| | | |
|---|---|---|
| CN | 109821687 A | 5/2019 |
| EP | 2537594 A1 | 12/2012 |

(Continued)

OTHER PUBLICATIONS

Extended European Search Report dated May 20, 2022, for EP Application No. 21212651.0.

(Continued)

*Primary Examiner* — Jethro M. Pence
(74) *Attorney, Agent, or Firm* — Colson Law Group, PLLC

(57) ABSTRACT

A robot system is provided, which includes a paint booth, and a pretreatment robot configured to perform painting pretreatment on a workpiece that is an object to be painted, the pretreatment robot being an explosion-proof robot disposed in the paint booth and including an end effector used for the painting pretreatment.

12 Claims, 6 Drawing Sheets

(56) References Cited

U.S. PATENT DOCUMENTS

| | | | | |
|---|---|---|---|---|
| 4,984,745 | A * | 1/1991 | Akeel | B25J 19/0029 239/587.2 |
| 5,421,218 | A * | 6/1995 | Akeel | B25J 19/0079 901/49 |
| 5,949,209 | A * | 9/1999 | Okamoto | B25J 19/0079 318/563 |
| 6,328,799 | B1 | 12/2001 | Inoue | B25J 19/0029 118/683 |
| 6,477,913 | B1 * | 11/2002 | Akeel | B25J 19/0079 901/49 |
| 6,641,667 | B2 * | 11/2003 | Ochiai | B05B 7/1263 118/321 |
| 6,835,248 | B1 * | 12/2004 | Haas | B05B 13/0431 901/43 |
| 7,456,753 | B2 * | 11/2008 | Kitagawa | H01H 35/24 340/532 |
| 7,464,622 | B2 * | 12/2008 | Markert | B25J 19/0079 74/490.01 |
| 7,908,994 | B2 * | 3/2011 | Herre | B05B 12/14 901/29 |
| 7,915,773 | B2 * | 3/2011 | Takahashi | H02K 5/136 310/83 |
| 8,393,292 | B2 * | 3/2013 | Yoshino | B05B 13/0452 901/43 |
| 8,627,740 | B2 * | 1/2014 | Skourup | B25J 19/0079 901/50 |
| 8,894,343 | B2 * | 11/2014 | Yoshino | B25J 9/106 414/223.01 |
| 8,939,106 | B2 * | 1/2015 | Takahashi | B05B 16/40 118/698 |
| 9,126,330 | B2 * | 9/2015 | Yoshino | B05B 13/0431 |
| 10,092,923 | B2 * | 10/2018 | Kitamura | B25J 11/0075 |
| 10,121,569 | B2 * | 11/2018 | Otsubo | H01B 7/1875 |
| 10,821,598 | B2 * | 11/2020 | Ohtsubo | B23K 11/3072 |
| 10,888,992 | B2 * | 1/2021 | Konno | B25J 19/0025 |
| 10,987,800 | B2 * | 4/2021 | Rouaud | B25J 9/046 |
| 11,167,296 | B2 * | 11/2021 | Fritz | B05B 13/0452 |
| 11,453,130 | B2 * | 9/2022 | Bi | B05B 12/122 |
| 11,518,041 | B2 * | 12/2022 | Onishi | B25J 19/00 |
| 11,541,532 | B2 * | 1/2023 | Yoshino | B25J 11/0075 |
| 11,548,164 | B2 * | 1/2023 | Collmer | B25J 19/0029 |
| 2006/0261192 | A1 * | 11/2006 | Haas | B05B 13/0431 239/533.1 |
| 2008/0047486 | A1 | 2/2008 | Herre et al. | |
| 2010/0233373 | A1 | 9/2010 | Swanberg et al. | |
| 2012/0325142 | A1 | 12/2012 | Takahashi | |
| 2013/0011234 | A1 * | 1/2013 | Pretlove | B25J 5/005 701/2 |
| 2013/0034660 | A1 * | 2/2013 | Koyanagi | B05B 13/0452 118/620 |
| 2018/0141220 | A1 * | 5/2018 | Maier | B25J 19/0079 |
| 2018/0169690 | A1 * | 6/2018 | Yoshino | B05B 13/0457 |
| 2018/0221904 | A1 * | 8/2018 | Yoshino | B05B 13/0452 |
| 2020/0282557 | A1 * | 9/2020 | Yamamoto | B25J 19/0079 |
| 2020/0347868 | A1 * | 11/2020 | Hezel | E05B 17/2046 |
| 2021/0146393 | A1 * | 5/2021 | Yoshino | B05B 13/0452 |
| 2021/0206000 | A1 | 7/2021 | Demura et al. | |
| 2022/0055056 | A1 * | 2/2022 | Zhang | B65G 19/02 |
| 2022/0176566 | A1 * | 6/2022 | Konno | B25J 11/0085 |

FOREIGN PATENT DOCUMENTS

| | | | | |
|---|---|---|---|---|
| JP | H0366577 | A | | 3/1991 |
| JP | 2010-089010 | A | | 4/2010 |
| JP | 2013006235 | A * | 1/2013 | ......... B05B 13/0452 |
| JP | 2013006235 | A | | 1/2013 |
| JP | 2013193034 | A * | 9/2013 | ............... B08B 1/04 |
| JP | 2013193034 | A | | 9/2013 |
| JP | 2018-126831 | A | | 8/2018 |
| JP | 2019209396 | A | | 12/2019 |
| KR | 20200043564 | A | | 4/2020 |

OTHER PUBLICATIONS

Notice of Reasons for Refusal for Japanese Application No. 2020-204232, dated Feb. 18, 2022.

Examiner's Report Before Trial dated Feb. 13, 2023.

Notice of Reasons for Rejection dated Oct. 24, 2023 for JP Application No. 2020-204232 (Appeal No. 2022-019299) and Partial English translation thereof.

* cited by examiner

ROBOT SYSTEM

CROSS REFERENCE TO RELATED APPLICATIONS

This application claims priority pursuant to 35 U.S.C. 119(a) to Japan Patent Application No. 2020-204232, filed Dec. 9, 2020, which application is incorporated herein by reference in its entirety.

TECHNICAL FIELD

Embodiments of the disclosure relate to a robot system.

BACKGROUND

There have been known robots configured to operate by driving each of a plurality of joint portions. End effectors suitable for applications such as welding and gripping are attached to distal ends of such robots, and various operations such as machining and moving workpieces are performed.

Further, there have been proposed dust removal systems configured to remove dust from a workpiece by using a dust-removing robot equipped with an end effector for dust removal (for example, refer to JP 2010-89010 A).

SUMMARY

Nevertheless, the known dust-removing robot described above is not purposed for an explosive atmosphere or a hazardous atmosphere, making it necessary to dispose the robot in a booth having a non-explosive atmosphere independent of the explosive atmosphere of a paint booth or the like. As a result, the overall scale of equipment is readily increased.

An object of an aspect of an embodiment is to provide a robot system that allows a reduced scale of equipment.

A robot system according to an aspect of an embodiment includes a paint booth and a pretreatment robot. The pretreatment robot is configured to perform painting pretreatment on a workpiece that is an object to be painted. The pretreatment robot is an explosion-proof robot disposed in the paint booth and includes an end effector used for the painting pretreatment.

According to an aspect of the embodiment, a robot system that allows a reduced scale of equipment can be provided.

DESCRIPTION OF EMBODIMENTS

Embodiments of a robot system disclosed in the present application will be described in detail below with reference to the accompanying drawings. Note that this disclosure is not limited by the embodiments illustrated below. Further, in the following, a case in which a vehicle such as an automobile is an object to be painted is described, but the object to be painted is not limited to a vehicle.

Further, in the embodiments described below, expressions such as "symmetrical", "horizontal", "perpendicular", "vertical", "same" or "center" are used, but it is not necessary to strictly satisfy these states. That is, each of the expressions described above allows deviations in manufacturing accuracy, installation accuracy, and the like.

Figure 1:
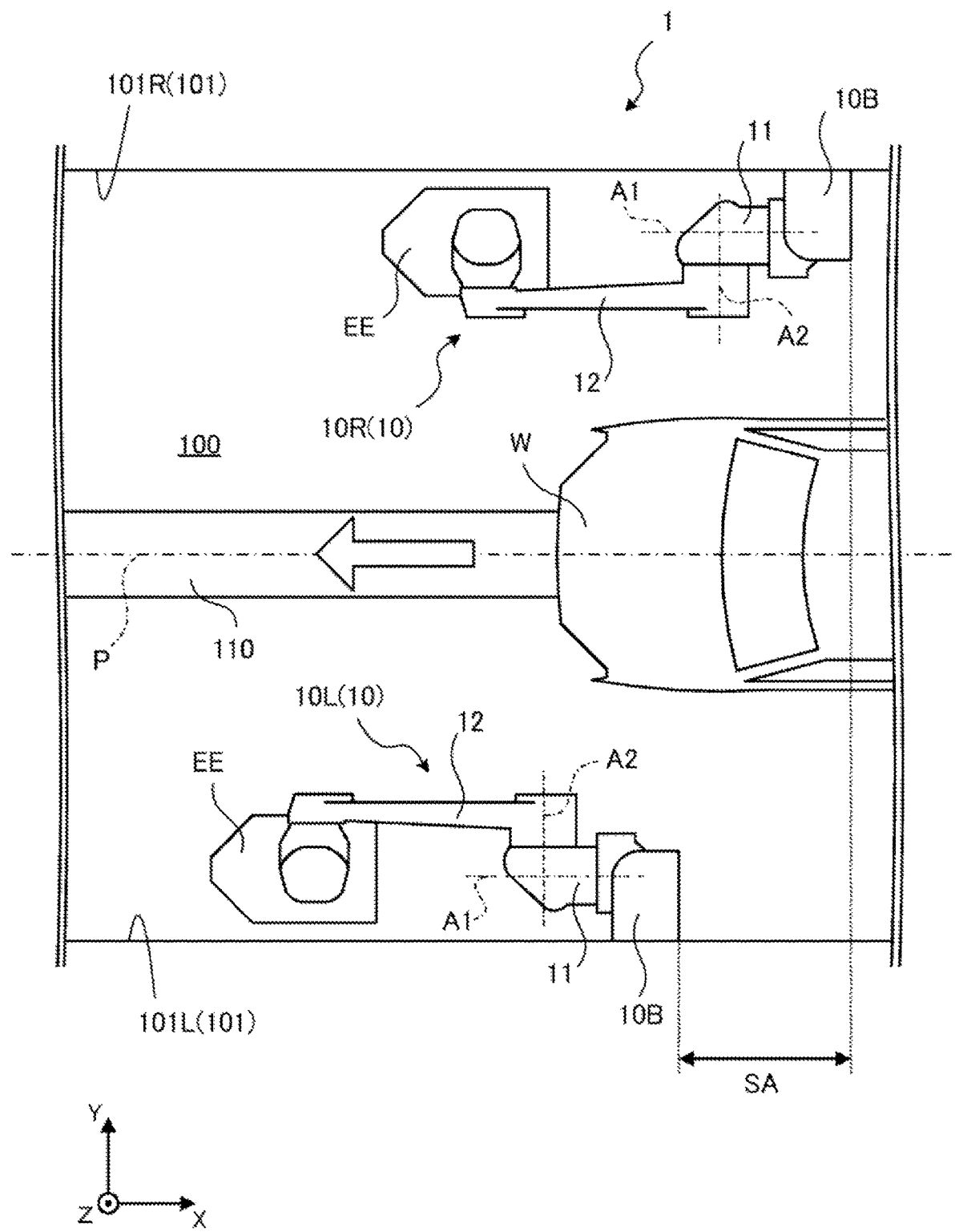
FIG. 1 is a schematic top view of a robot system according to an embodiment.

First, a robot system 1 according to an embodiment will be described with reference to FIG. 1. FIG. 1 is a schematic top view of the robot system 1 according to the embodiment. Note that, for ease of explanation, FIG. 1 illustrates a three-dimensional orthogonal coordinate system including an X axis in a longitudinal direction (length direction) of a paint booth 100, a Y axis in a lateral direction (width direction) of the paint booth 100, and a Z axis in which a vertically upward direction is a positive direction. Such an orthogonal coordinate system may also be illustrated in other drawings used in the following description.

Further, in the following, a transport direction (negative side in the X-axis direction) of a transport device 110 is referred to as "downstream", a reverse direction is referred to as "upstream", and rightward (positive side in the Y-axis direction) in the transport direction is referred to as "right" and leftward (negative side in the Y-axis direction) is referred to as "left". Further, when viewed from above, a plane passing through a center of the transport device 110 (center of a workpiece W) in the transport direction is referred to as a "transport center plane P". Note that the transport center plane P is parallel to the XZ plane. Further, for reference, FIG. 1 illustrates an open arrow (arrow pointing in the negative direction from the X-axis positive direction) that represents the transport direction.

As illustrated in FIG. 1, the robot system 1 includes the paint booth 100 and a pretreatment robot 10 that performs painting pretreatment on the workpiece W that is an object to be painted. The paint booth 100 is a room for painting including a space isolated from the outside, and extends in the transport direction.

The transport device 110 such as a conveyor is installed on a floor of the paint booth 100. Then, the transport device 110 transports the workpiece W, which is the object to be painted, at a predetermined speed in a predetermined transport direction (X-axis negative direction in the case illustrated in FIG. 1). Note that the workpiece W is transported in a state fixed to a movable portion of the transport device 110 by a jig (not illustrated) or the like.

Note that the area illustrated in FIG. 1 corresponds to a "pretreatment area" for implementing painting pretreatment on the workpiece W before painting, and a "painting area" in which a painting process is performed by a paint robot (not illustrated) or the like continues downstream of the pretreatment area. That is, the workpiece W, which has completed the painting pretreatment in the pretreatment area upstream, is transported as is by the transport device 110 to the painting area downstream and the painting process is performed.

Here, "painting pretreatment" includes a dust removal process that removes foreign material such as dust adhering to the workpiece W before painting, and a neutralization process that removes static electricity in order to prevent re-adherence of the foreign material. An end effector EE illustrated in FIG. 1 performs, as a single unit, both the dust removal process and the neutralization process. Note that details of the end effector EE will be described below with reference to FIG. 5.

As illustrated in FIG. 1, the pretreatment robot 10 is a so-called explosion-proof robot disposed in the paint booth 100. Further, the pretreatment robot 10 includes the end effector EE used for painting pretreatment. Here, "explosion-proof robot" refers to a robot in which an internal pressure is increased by supplying a non-flammable gas, such as nitrogen, for example, to an interior thereof, imparting a non-explosive atmosphere to the interior.

With the pretreatment robot 10 thus configured as an explosion-proof robot, the pretreatment robot 10 can be disposed in the paint booth 100 having an explosive atmosphere or a hazardous atmosphere in an interior thereof. Accordingly, a scale of equipment of the painting process as a whole, including the painting pretreatment, can be reduced. Further, because the painting pretreatment and the painting process can be performed in the same paint booth 100, re-adherence of dust in association with entry into and exit from the booth can be prevented, which in turn makes it possible to reduce a defect rate of the workpiece W.

As illustrated in FIG. 1, two pretreatment robots 10 are disposed in the paint booth 100. Thus, for each pretreatment robot 10, a character for identification is added at the end of the reference sign.

Specifically, "R" is added for the pretreatment robot 10 disposed on the right side of the transport device 110, and "L" is added for the pretreatment robot 10 disposed on the left side. Note that, in the present embodiment, the number of the pretreatment robots 10 is two, but may be one or three or more.

Here, the workpiece W has, for example, a symmetrical shape with respect to the transport center plane P. However, the workpiece W need not be strictly symmetrical in shape, and it is sufficient that the workpiece W be symmetrical to the extent that the robot on the left side and the robot on the right side of the workpiece W can perform painting pretreatment with the same operation. Note that the pretreatment robot 10R performs work on the right side of the workpiece W and the pretreatment robot 10L performs work on the left side.

In this way, because the workpiece W has a symmetrical shape with respect to the transport center plane P, the pretreatment robot 10R and the pretreatment robot 10L disposed with the transport device 110 interposed therebetween can perform painting pretreatment on the workpiece W while performing operations symmetrical to each other.

Each pretreatment robot 10 is a vertical articulated robot. Note that, while the pretreatment robot 10 can be installed on a side surface, a ceiling, or the floor of the paint booth 100, FIG. 1 illustrates a case where the pretreatment robot 10 is installed on a side wall 101 corresponding to a side surface.

Specifically, the pretreatment robot 10 is fixed to pillars, beams, or the like disposed so as to surround the paint booth 100, and a wall surface such as the side wall 101 is attached to an inner side of a fixed location in the paint booth 100. Note that, similar to the case of the pretreatment robot 10, the side wall 101 on the right side and the side wall 101 on the left side of the transport device 110 are described as a side wall 101R and a side wall 101L, respectively.

As illustrated in FIG. 1, the pretreatment robot 10R and the pretreatment robot 10L are each disposed sandwiching the workpiece W in the transport direction of the workpiece W, and the axial configurations are mutually symmetrical with respect to the transport center plane P in the transport direction. Here, "axial configuration" refers to the arrangement of each axis around which each arm is pivoted or rotated.

Further, the arrangement of each axis includes angles formed by axes adjacent to each other, and axial distances between axes adjacent to each other. That is, profiles and shapes of the arms may be varied. Then, as long as the arrangements of the axes are symmetrical with respect to the plane of symmetry (transport center plane P in the case of FIG. 1), the "axial configurations are mutually symmetrical" even if the profiles and shapes of the arms differ.

In this way, the pretreatment robots 10 are given mutually symmetrical axial configurations, making it possible to efficiently perform work from both sides of the workpiece W and thus effectively re-utilize and re-purpose teaching data, suppress the workload of teaching (teaching work) and, in turn, suppress the cost of the robot system 1 as a whole. Note that, in the case of the pretreatment robot 10R and the pretreatment robot 10L having axial configurations mutually symmetrical with respect to the transport center plane P, the teaching data can be effectively re-utilized by inverting the Y axis of the teaching data.

A description of the pretreatment robot 10 is continued below. As illustrated in FIG. 1, the pretreatment robot 10 includes a first arm 11 that rotates about a first axis A1 and a second arm 12 that pivots about a second axis A2 perpendicular to the first axis A1. Then, the pretreatment robots 10 are each disposed so that, in a reference posture of the first arm 11, the second arm 12 is in a position closer to the workpiece W than the first axis A1. Note that the configuration on a distal end side of the second arm 12 will be described below with reference to FIG. 2.

Here, the "reference posture" of the first arm 11 refers to a posture in which a rotation angle of the first arm 11 is 0 degrees. Note that the same applies to the reference posture of the other arms. The posture of each of the pretreatment robots 10 illustrated in FIG. 1 corresponds to the reference posture.

Specifically, a base portion 10B of the pretreatment robot 10R is fixed to the side wall 101R. The first arm 11 supported by the base portion 10B at a downstream side thereof and configured to extend downstream rotates about the first axis A1 parallel to the transport direction. Further, the second arm 12 supported by the first arm 11 pivots about the second axis A2 perpendicular to the first axis A1. Then, in the reference posture illustrated in FIG. 1, the second arm 12 is in a position closer to the workpiece W than the first axis A1.

Here, "pivot" refers to an operation of changing the angle formed between adjacent arms, and "rotate" refers to an operation of relatively rotating the adjacent arms without changing the angle formed between the arms. Note that "pivot" also refers to an operation of swiveling the arm about the rotation axis, and "rotate" also refers to an operation of turning the arm such that an extending direction of the arm is along the rotation axis.

On the other hand, the base portion 10B of the pretreatment robot 10L is fixed to the side wall 101L. The first arm 11 supported by the base portion 10B at a downstream side thereof and configured to extend downstream rotates about the first axis A1 parallel to the transport direction. Further, the second arm 12 supported by the first arm 11 pivots about the second axis A2 perpendicular to the first axis A1. Then, in the reference posture illustrated in FIG. 1, the second arm 12 is in a position closer to the workpiece W than the first axis A1.

In this manner, each of the pretreatment robots 10 is disposed so that the second arm 12 is on the workpiece W side, thereby making it less likely that the second arm 12 will interfere with the side wall 101 of the paint booth 100. Accordingly, interference between the pretreatment robot 10 and the paint booth 100 can be suppressed. Note that FIG. 1 illustrates a case in which the first arm 11 is supported by the base portion 10B on the downstream side thereof and extends downstream, but the first arm 11 may be supported on the upstream side and extend upstream.

As described above, the paint booth 100 includes the side walls 101 each disposed sandwiching the workpiece W in the transport direction, and the pretreatment robots 10 are respectively wall-mounted on the side walls 101. Since the pretreatment robots 10 are wall-mounted, this can contribute to a reduction in size of the paint booth 100.

Here, a running cost of the paint booth 100 is high in terms of the cost for maintaining the painting environment, such as air conditioning, and is proportional to the volume of the room. Accordingly, in a case where the size of the paint booth 100 is reduced, the running cost can be suppressed. Note that, in the present embodiment, a case in which the pretreatment robot 10 is wall-mounted is described, but the pretreatment robot 10 may be placed on the floor or may be suspended.

Incidentally, as illustrated in FIG. 1, the pretreatment robots 10 are each disposed so that the first axis A1 is oriented in the transport direction, and thus a work range with respect to the workpiece W can be widely secured while suppressing interference between the pretreatment robots 10 and the paint booth 100.

Note that, as illustrated in FIG. 1, the pretreatment robots 10 are respectively disposed at positions offset in the transport direction. In the case illustrated in FIG. 1, the pretreatment robot 10R is disposed shifted upstream by "SA" from the pretreatment robot 10L.

In this way, the pretreatment robots 10 are disposed shifted in the transport direction, making it possible to suppress interference between the end effectors EE in the painting pretreatment. Note that the pretreatment robot 10R may be disposed shifted downstream of the pretreatment robot 10L. Further, the pretreatment robots 10 may not be shifted in the transport direction, and a case of not being shifted is described below with reference to FIG. 4.

Figure 2:
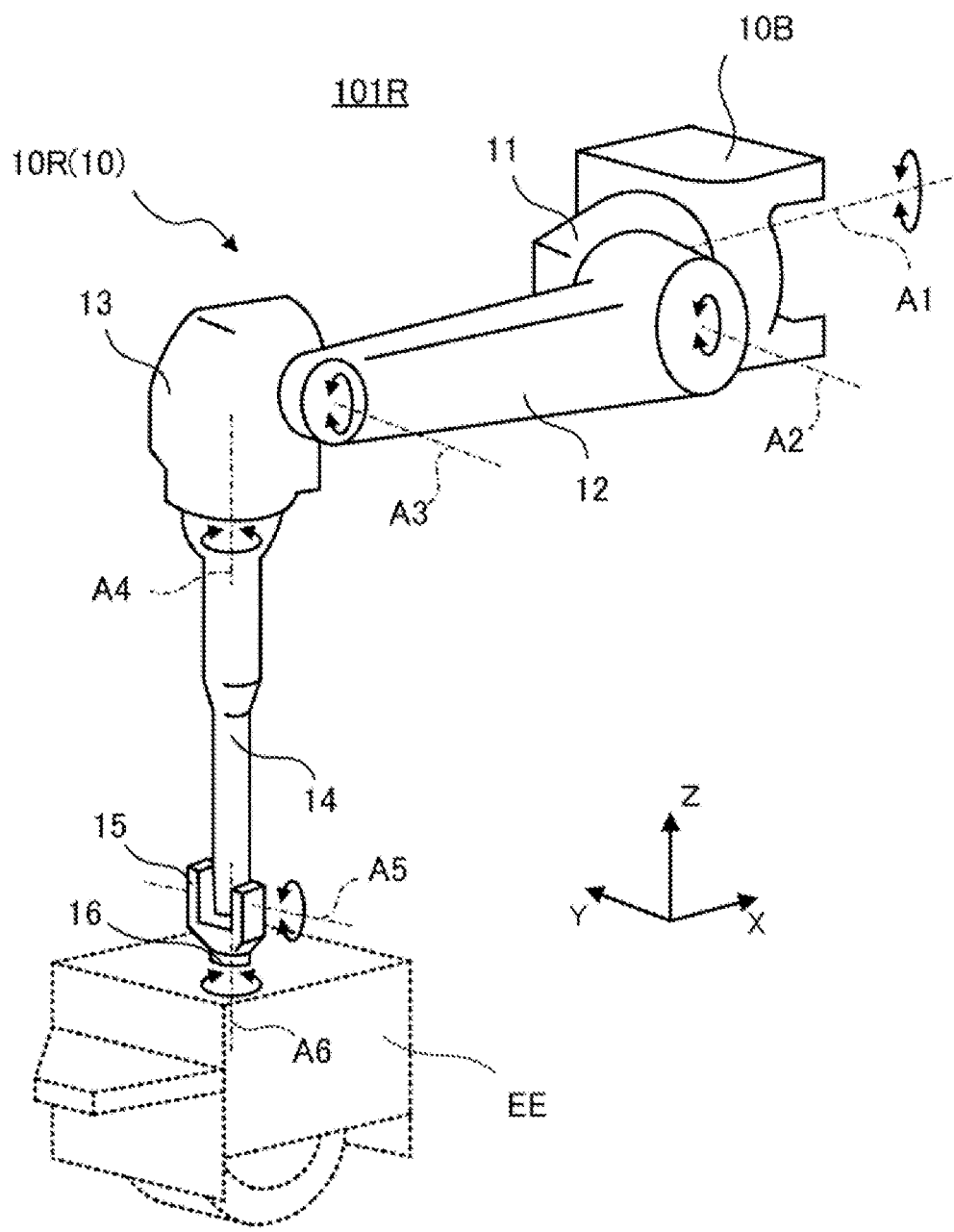
FIG. 2 is a perspective schematic view of a pretreatment robot.

Next, a configuration of the pretreatment robot 10 will be described with reference to FIG. 2. FIG. 2 is a perspective schematic view of the pretreatment robot 10R illustrated in FIG. 1. FIG. 2 corresponds to a perspective view of the pretreatment robot 10R, as viewed from above on the downstream side.

Note that details of the end effector EE indicated by dashed lines are described below with reference to FIG. 5. Further, as described above, the pretreatment robot 10L illustrated in FIG. 1 has an axial configuration symmetrical with that of the pretreatment robot 10R illustrated in FIG. 2, but all other configurations are the same as those of the pretreatment robot 10R.

As illustrated in FIG. 2, the pretreatment robot 10 is a 6-axis vertical articulated robot having six axes of rotation, namely the first axis A1, the second axis A2, a third axis A3, a fourth axis A4, a fifth axis A5, and a sixth axis A6.

The pretreatment robot 10 includes joint portions corresponding to each of the axes, and changes posture by pivoting or rotating each arm by an actuator (not illustrated) that drives each of the joint portions. Further, the 6-axis robot illustrated in FIG. 2 is an example of the pretreatment robot 10, and a robot having a number of axes other than six may be used.

The pretreatment robot 10 is provided with, going from a base end side toward a distal end side, the base portion 10B, the first arm 11, the second arm 12, a third arm 13, a fourth arm 14, a fifth arm 15, and a sixth arm 16.

The base portion 10B is fixable to an attachment target such as the paint booth 100 (refer to FIG. 1). Here, as illustrated in FIG. 2, the base portion 10B has a rectangular parallelepiped shape and, of the six surfaces, any of the five surfaces other than the surface on which the first arm 11 is provided can be fixed to an attachment surface of the attachment target. That is, according to such a base portion 10B, the pretreatment robot 10 can be freely disposed on the floor, a side surface, or the ceiling of the paint booth 100.

The first arm 11 is supported on the base end side by the base portion 10B so as to be rotatable about the first axis A1 oriented along the X axis. The second arm 12 is supported on the base end side by a distal end of the first arm 11, so as to be pivotable about the second axis A2 perpendicular to the first axis A1. The third arm 13 is supported on the base end side by a distal end of the second arm 12, so as to be pivotable about the third axis A3 parallel with the second axis A2.

The fourth arm 14 is supported on the base end side by a distal end of the third arm 13, so as to be rotatable about the fourth axis A4 perpendicular to the third axis A3. The fifth arm 15 is supported on the base end side by a distal end of the fourth arm 14, so as to be pivotable about the fifth axis A5 perpendicular to the fourth axis A4. The sixth arm 16 is supported on the base end side by a distal end of the fifth arm 15, so as to be rotatable about the sixth axis A6 perpendicular to the fifth axis A5. Then, the end effector EE is removably attached to a distal end side of the sixth arm 16.

As illustrated in FIG. 2, the fourth arm 14 has a thinner profile than that of the second arm 12, and thus the painting pretreatment by the end effector EE can be performed on the workpiece W while avoiding contact with the workpiece W (refer to FIG. 1).

Here, the actuator built into each arm has sufficient torque for moving the position and the posture of the end effector EE to a target position and posture. Further, each arm has sufficient strength to move the end effector EE into a predetermined position and posture. Accordingly, the pretreatment robot 10 can reliably perform painting pretreatment on the workpiece W illustrated in FIG. 1.

Note that, as described below with reference to FIG. 5, a hose 504 (refer to FIG. 5) connected to the end effector EE is disposed not inside, but outside each arm of the pretreatment robot 10. As a result, the profile of each arm can be reduced.

Figure 3:
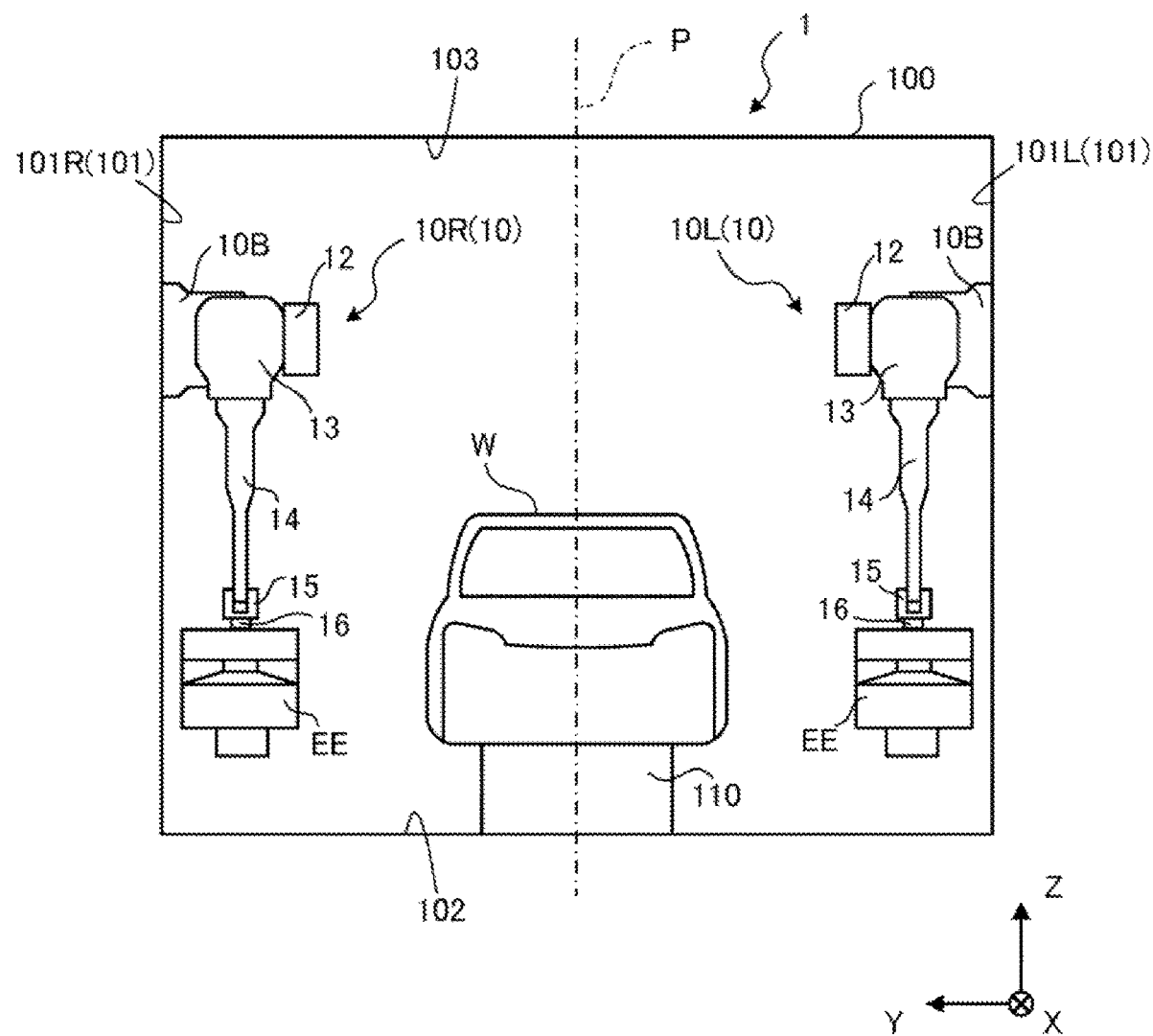
FIG. 3 is a schematic side view of a paint booth as viewed from a downstream side.

Next, a side view of the paint booth 100 illustrated in FIG. 1 as viewed from a downstream side will be described with reference to FIG. 3. FIG. 3 is a schematic side view of the paint booth 100 as viewed from the downstream side. Here, FIG. 3 corresponds to a side view of the robot system 1 illustrated in FIG. 1, as viewed from the downstream side in the transport direction. Note that the first arm 11 illustrated in FIG. 1 is hidden behind the second arm 12 and the third arm 13, and thus is not illustrated. Further, the posture of each of the pretreatment robots 10 illustrated in FIG. 3 corresponds to the reference posture described above.

As illustrated in FIG. 3, the paint booth 100 is surrounded by a pair of the side walls 101, a floor wall 102, and a ceiling wall 103 and extends in a transport direction (direction along the X axis). The transport device 110 is disposed on the floor wall 102, and the workpiece W is transported by the transport device 110. Further, the pair of pretreatment robots 10 are respectively mounted on the pair of side walls 101.

Specifically, the pretreatment robot 10R that performs painting pretreatment on the workpiece W from the right side (positive side in the Y-axis direction) is fixed to the side wall 101R. Further, the pretreatment robot 10L that performs painting pretreatment on the workpiece W from the left side (negative side in the Y-axis direction) is fixed to the side wall 101L.

Note that, as illustrated in FIG. 3, the pretreatment robot 10R and the pretreatment robot 10L are disposed so that the base portions 10B are each at the same height at a position higher than an upper surface of the workpiece W. That is, each of the pretreatment robots 10 has an operation range accessible to the workpiece W from diagonally upward.

The second arm 12 of the pretreatment robot 10R is disposed at a position farthest among the arms from the side wall 101R, that is, in a position closer to the workpiece W, and the third arm 13 to the sixth arm 16 are disposed closer to the side wall 101R than the second arm 12.

Further, the second arm 12 of the pretreatment robot 10L is disposed at a position farthest among the arms from the side wall 101L, that is, in a position closer to the workpiece W, and the third arm 13 to the sixth arm 16 are disposed closer to the side wall 101L than the second arm 12.

Thus, the pretreatment robot 10R and the pretreatment robot 10L have a mirror-image relationship with each other with respect to the transport center plane P. That is, the pretreatment robot 10R and the pretreatment robot 10L have axial configurations symmetrical with respect to the transport center plane P.

Figure 4:
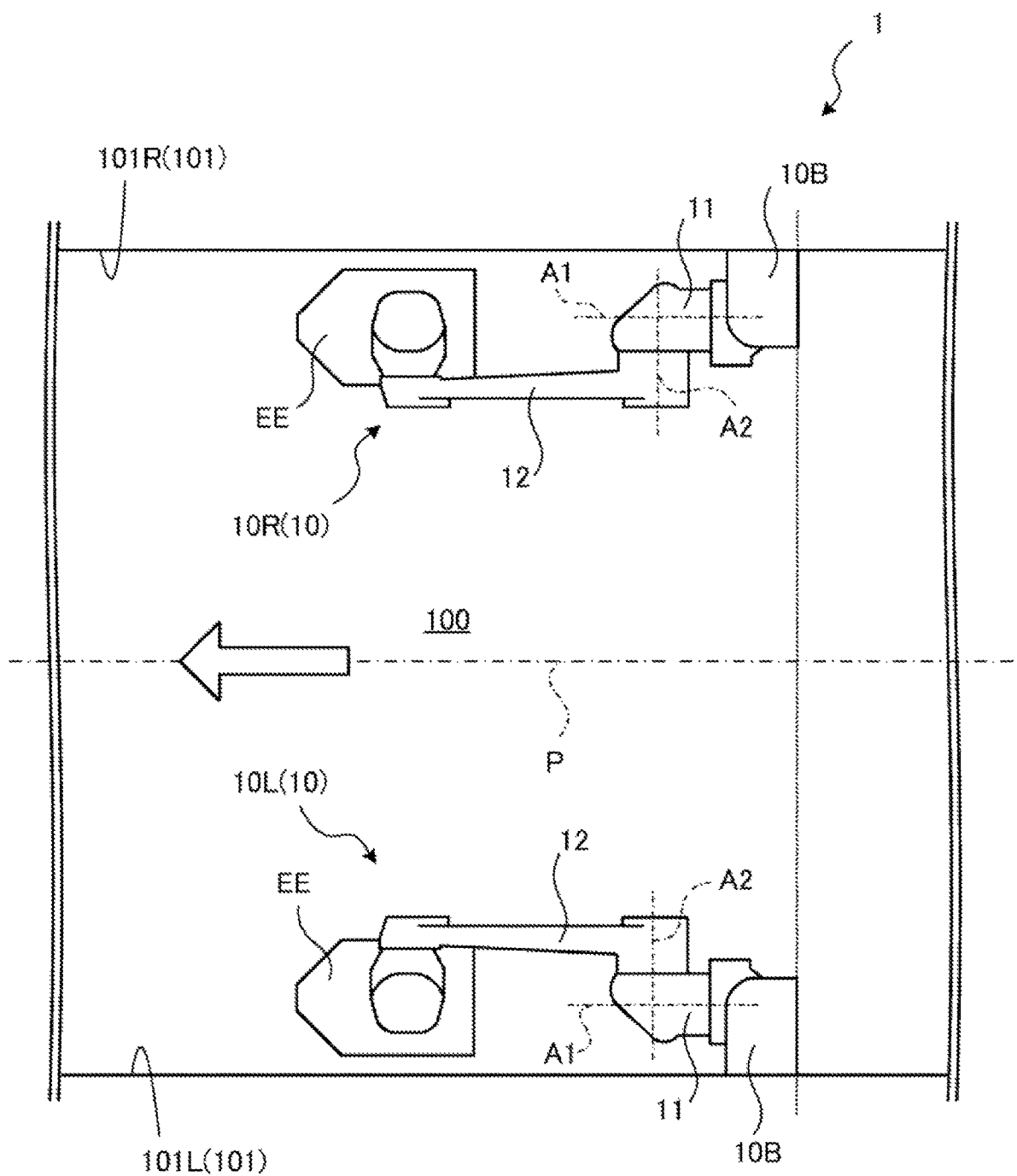
FIG. 4 is an explanatory view illustrating a symmetry of axial configurations.

Next, the symmetry of the axial configurations of the pretreatment robot 10R and the pretreatment robot 10L will be further described with reference to FIG. 4. FIG. 4 is an explanatory view illustrating the symmetry of the axial configurations. Here, FIG. 4 is a schematic top view corresponding to FIG. 1, but differs from FIG. 1 in that each pretreatment robot 10 is disposed at the same position in the transport direction in order to facilitate explanation of symmetry. Further, in FIG. 4, description of the workpiece W illustrated in FIG. 1 is omitted. Note that the posture of each of the pretreatment robots 10 corresponds to the reference posture described above.

As illustrated in FIG. 4, the base portion 10B of the pretreatment robot 10R and the base portion 10B of the pretreatment robot 10L are symmetrical with respect to the transport center plane P. Further, the first arm 11 and the second arm 12 of the pretreatment robot 10R and the first arm 11 and the second arm 12 of the pretreatment robot 10L are also symmetrical with respect to the transport center plane P. Furthermore, the pretreatment robots 10 are symmetrical with respect to the transport center plane P in terms of the third arm 13 to the sixth arm 16 illustrated in FIG. 3 as well.

Thus, the pretreatment robot 10R and the pretreatment robot 10L have a mirror-image relationship with each other with respect to the transport center plane P. That is, the pretreatment robot 10R and the pretreatment robot 10L have axial configurations symmetrical with respect to the transport center plane P.

Note that, while FIG. 4 illustrates a case in which the first arm 11 of each of the pretreatment robots 10 is downstream of the base portion 10B and extends downstream, the first arm 11 may be configured to be upstream and extend upstream.

Next, the end effector EE illustrated in FIG. 1 and the like will be described with reference to FIG. 5. FIG. 5 is a perspective schematic view illustrating an arrangement example of the end effector EE and the hose 504. Note that FIG. 5 corresponds to a perspective view of the pretreatment robot 10R to which the end effector EE is attached, as viewed from above on the downstream side, as in FIG. 2.

Figure 5:
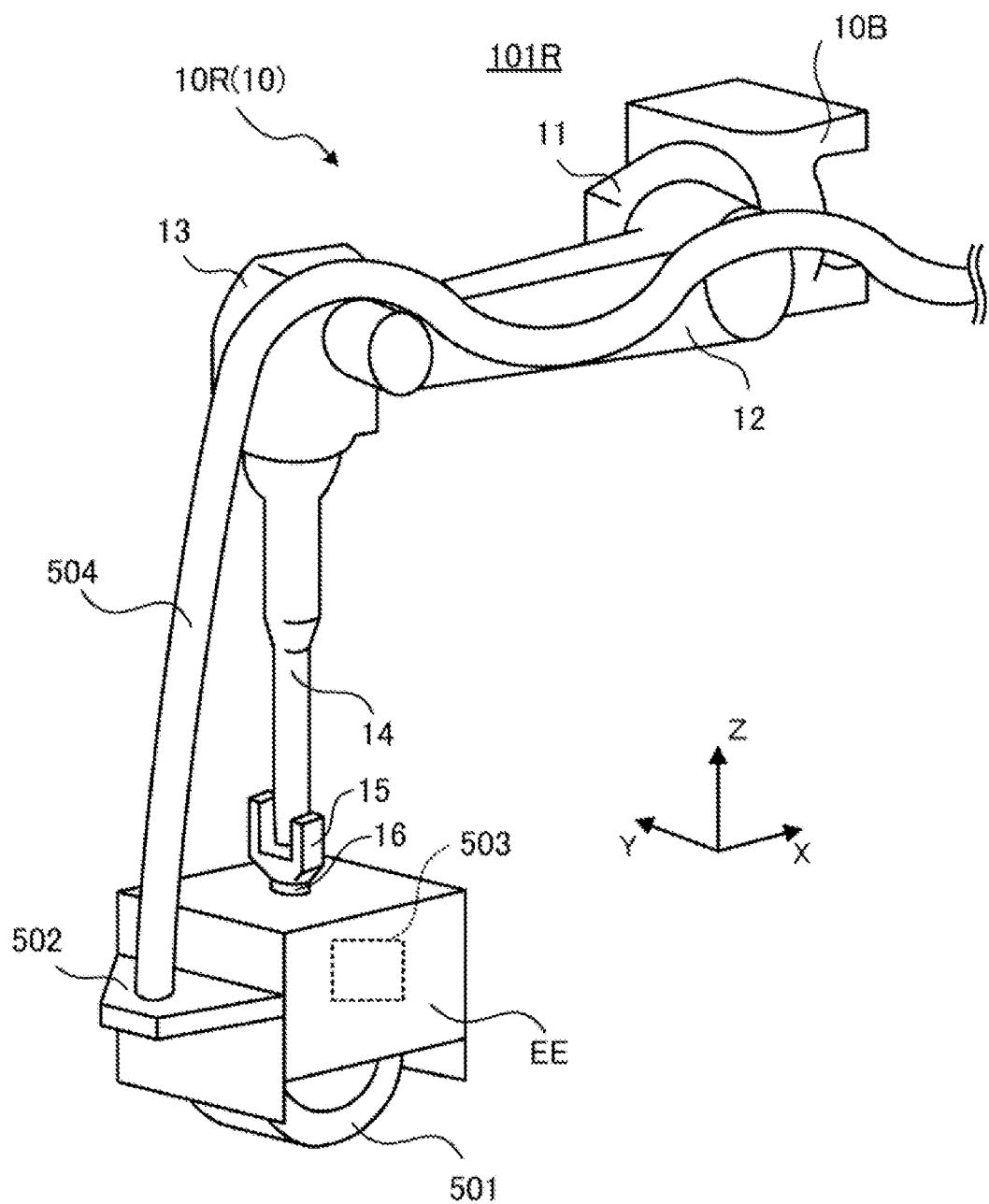
FIG. 5 is a perspective schematic view illustrating an arrangement example of an end effector and a hose.

As illustrated in FIG. 5, the end effector EE includes a rotary brush 501, a connection portion 502, and a neutralization unit 503. Further, the hose 504 for the dust removal process is connected to the connection portion 502. The dust removal process is performed in which foreign material such as dust, removed from the workpiece W (refer to FIG. 1) by the rotary brush 501 rotating a brush provided on an outer circumference of a roller by the rotational force of the actuator, is discharged via the hose 504 by suction.

The neutralization unit 503 is an ionizer provided in an interior of the end effector EE, and performs the neutralization process by supplying generated ions to the rotary brush 501. That is, the end effector EE is a device that performs the dust removal process and the neutralization process as the painting pretreatment.

Thus, the pretreatment robot 10 has a strength and a torque capable of handling the end effector EE that, as a single unit, performs both the dust removal process and the neutralization process, thereby eliminating the need to provide a robot for each pretreatment and, in turn, making it possible to contribute to a reduction in size of the paint booth 100 (refer to FIG. 1).

Further, as illustrated in FIG. 5, the hose 504 is routed on the workpiece W (refer to FIG. 1) side, outside the second arm 12. Specifically, the hose 504 is connected to the connection portion 502 of the end effector EE via the workpiece W side of the second arm 12 and the third arm 13. Note that the hose 504 is routed on front surfaces of the second arm 12 and the third arm 13 by a fitting such as a cable tie.

In this way, since the hose 504 is routed on the workpiece W side of the second arm 12, interference between the hose 504 and the side wall 101R can be suppressed. That is, interference between the hose 504 and the paint booth 100 (refer to FIG. 1) can be suppressed.

Figure 6:
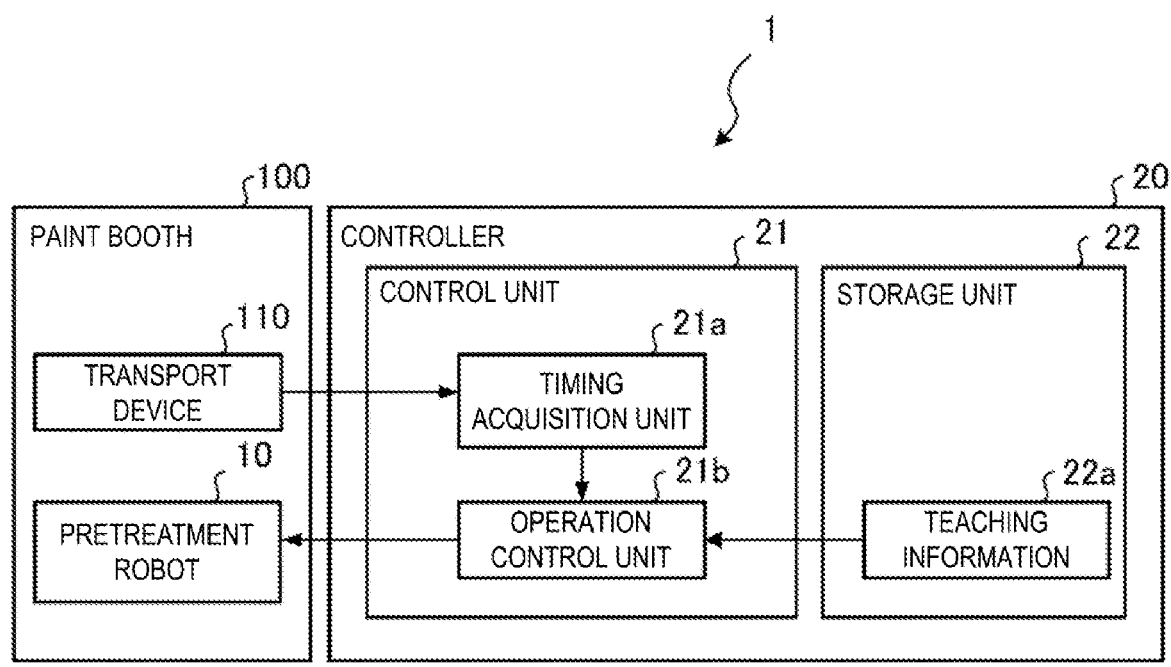
FIG. 6 is a block diagram illustrating a configuration of the robot system.

Next, a configuration of the robot system 1 according to the embodiment will be described with reference to FIG. 6. FIG. 6 is a block diagram illustrating the configuration of the robot system 1. As illustrated in FIG. 6, the robot system 1 includes the transport device 110 and the pretreatment robot 10 inside the paint booth 100.

Further, the robot system 1 also includes a controller 20. Note that the transport device 110 and the pretreatment robot 10 are connected to the controller 20.

As already described, the transport device 110 is a device such as a conveyor that transports the workpiece W in the predetermined transport direction. Note that the transport device 110 includes a detection device (not illustrated) such as a sensor that detects the position of the workpiece W, and notifies the controller 20 of a timing at which the workpiece W passed or the like. Further, the transport device 110 transports the workpiece W at a constant speed.

The pretreatment robot 10 is a robot that performs painting pretreatment on the workpiece W before painting. In the case illustrated in FIG. 1, two pretreatment robots 10 are installed in the paint booth 100. Note that the configuration of the pretreatment robot 10 has been described above with reference to FIG. 2, and thus descriptions thereof will be omitted.

The controller 20 includes a control unit 21 and a storage unit 22. The control unit 21 includes a timing acquisition unit 21a and an operation control unit 21b. The storage unit 22 stores teaching information 22a. Note that, while one controller 20 is illustrated in FIG. 6 for ease of explanation, a plurality of the controllers 20 may be used for each of the pretreatment robots 10, for example. In this case, an upper level controller that manages the controllers 20 may be provided.

Here, the controller 20 includes, for example, a computer including a central processing unit (CPU), a read only memory (ROM), a random access memory (RAM), a hard disk drive (HDD), an input/output port, and the like, and various circuits.

The CPU of the computer functions as the timing acquisition unit 21a and the operation control unit 21b of the control unit 21 by reading and executing a program stored in the ROM, for example.

Further, at least one or all of the timing acquisition unit 21a and the operation control unit 21b may be constituted by hardware such as an application specific integrated circuit (ASIC) or a field programmable gate array (FPGA).

The storage unit 22 corresponds to, for example, a RAM or an HDD. The RAM or the HDD can store the teaching information 22a. Note that the controller 20 may acquire the above-described program and various information via another computer or a portable recording medium connected by a wired or wireless network. Furthermore, as described above, the controller 20 may be configured as a plurality of devices capable of communicating with one another, or may be configured as a hierarchical device capable of communicating with an upper level or a lower level device.

The control unit 21 controls the operation of each robot while acquiring, from the transport device 110, position information (pulse signal) of a jig such as a stand that fixes the workpiece W (refer to FIG. 1) to the movable portion of the transport device 110, and an interlock signal for causing each device to operate exclusively. Note that, in a case in which a plurality of the controller 20 are provided, the control unit 21 also performs a process of synchronizing the controllers 20.

The timing acquisition unit 21a acquires the position information and the interlock signal described above from the transport device 110. Then, the timing acquisition unit 21a determines the operation timing of each robot in accordance with the acquired position information and the interlock signal, and notifies the operation control unit 21b of the determined operation timing. For example, the timing acquisition unit 21a acquires a timing at which the workpiece W (refer to FIG. 1) reaches a predetermined position in the paint booth 100, and instructs the operation control unit 21b to operate each robot on the basis of the acquired timing.

The operation control unit 21b operates each robot on the basis of the instruction from the timing acquisition unit 21a and the teaching information 22a. The operation control unit 21b enhances an operating accuracy of each robot by performing feedback control while using an encoder value in the actuator (not illustrated) of each robot, or the like.

The teaching information 22a is created in a teaching stage of teaching an operation to each robot, and is information including a "job" that is a program for defining an operation path of each robot. Note that, as described above, the robot system 1 uses robots having symmetrical arm configurations, and thus the teaching data for each robot can be utilized upon inversion. Accordingly, according to the robot system 1, the labor and cost of generating the teaching information 22a including such teaching data can be suppressed.

As described above, the robot system 1 according to the embodiment includes the paint booth 100 and the pretreatment robot 10. The pretreatment robot 10 performs painting pretreatment on the workpiece W, which is an object to be painted. Further, the pretreatment robot 10 is an explosion-proof robot disposed in the paint booth 100 and including the end effector EE for the painting pretreatment.

As described above, according to the robot system 1 according to the embodiment, the pretreatment robot 10 that performs the painting pretreatment on the workpiece W is an explosion-proof robot, and thus the pretreatment robot 10 can be disposed in the paint booth 100 having an explosive atmosphere. Accordingly, there is no need for a booth that has a non-explosive atmosphere and is separate from the paint booth 100, and the scale of equipment of the painting process as a whole can be reduced.

Note that, while an example is given in the embodiment above in which the workpiece is transported by the transport device, the workpiece may be fixed and the pretreatment robot or a painting robot (not illustrated) may be slid in the transport direction. Further, while in the embodiment described above a case is described in which the orientation of the first axis of the wall-mounted pretreatment robot is in the transport direction, the orientation of the first axis may be set as a vertical when the pretreatment robot is placed on the floor or suspended.

Additional effects and modifications can be readily derived by a person skilled in the art. Thus, the broader aspects of the present disclosure are not limited to the specific details and representative examples illustrated and described above. Accordingly, various modifications may be made without departing from the spirit or scope of the general inventive concept as defined by the appended claims and their equivalents.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A robot system comprising:
    a paint booth;
    a pretreatment robot configured to perform painting pretreatment on a workpiece that is an object to be painted, the pretreatment robot having one or more arms; and,
    a hose connected to an end effector,
    wherein the pretreatment robot is an explosion-proof robot disposed in the paint booth and including the end effector used for the painting pretreatment, and the hose is disposed entirely outside of the one or more arms of the pretreatment robot.

2. The robot system according to claim 1, wherein:
    a plurality of the pretreatment robots are each disposed sandwiching the workpiece in a transport direction of the workpiece, with axial configurations being mutually symmetrical with respect to a transport center plane in the transport direction.

3. The robot system according to claim 2, wherein:
    the one or more arms of the pretreatment robot includes:
    a first arm configured to rotate about a first axis;
    a second arm configured to pivot about a second axis perpendicular to the first axis; and, the first arm and the second arm are each disposed such that, in a reference posture of the first arm, the second arm is disposed at a position closer to the workpiece than the first axis.

4. The robot system according to claim 3, wherein:
the paint booth includes side walls each disposed sandwiching the workpiece in the transport direction; and,
a plurality of the pretreatment robots are wall-mounted on the side walls, respectively.

5. The robot system according to claim 3, wherein:
a plurality of the pretreatment robots are each disposed such that the first axis is oriented in the transport direction.

6. The robot system according to claim 3, wherein:
the end effector performs a dust removal process and a neutralization process as the painting pretreatment.

7. The robot system according to claim 6, wherein:
the hose is for the dust removal process; and the hose is routed on the workpiece side, outside of the second arm.

8. The robot system according to claim 2, wherein:
a plurality of the pretreatment robots are disposed at positions offset in the transport direction, respectively.

9. The robot system according to claim 4, wherein:
a plurality of the pretreatment robots are each disposed such that the first axis is oriented in the transport direction.

10. The robot system according to claim 4, wherein:
the end effector performs a dust removal process and a neutralization process as the painting pretreatment.

11. The robot system according to claim 5, wherein:
the end effector performs a dust removal process and a neutralization process as the painting pretreatment.

12. The robot system according to claim 9, wherein:
the end effector performs a dust removal process and a neutralization process as the painting pretreatment.

* * * * *